Figure 1:
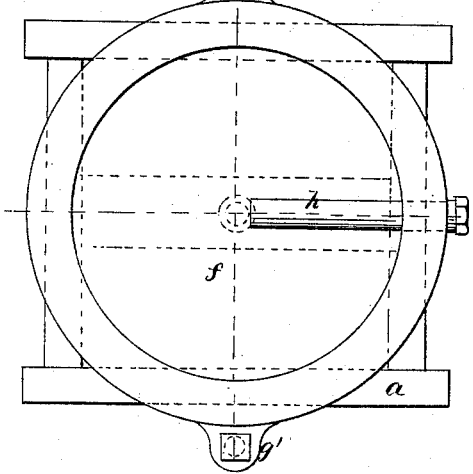

J. Muir,
Preparing Potters' Clay.
N° 45,737.    Patented Jan. 3, 1865.

Witnesses:
F. C. Tuaudl Jr.
Guernsey Jackett

Inventor;
Joseph Muir

UNITED STATES PATENT OFFICE.

JOSEPH MUIR, OF NEW YORK, N. Y.

PROCESS OF PREPARING CLAY FOR POTTERS' USE.

Specification forming part of Letters Patent No. 45,737, dated January 3, 1865.

*To all whom it may concern:*

Be it known that I, JOSEPH MUIR, of the city, county, and State of New York, have invented a new and useful Improvement in the Process of Preparing Kaolin or China-Clay and other Clays for Potters' Use; and I hereby declare that the following is a full and correct description thereof, reference being had to the annexed drawings, making a part of this specification, which represent the form of apparatus I use in working out my said invention.

In the preparation of kaolin or china-clay and other clays for potters' use it is the practice to grind or pulverize them in water, to allow the mica and other undesirable substances to separate from the mixture, by placing it in a vat or other containing vessel, and drawing off the milky pap from the vessel, leaving the undesirable matters at the bottom. It has also been the practice to separate the coarser substances from the mixture by passing it through fine sieves. There remains after these operations a milky fluid mixture, "sometimes called pap," which consists of water and very finely-divided particles of clay held in suspension therein. To this mixture, is added sometimes a mixture of finely-ground flint and water, and the whole stirred together, and then suffered to run into a vat or containing vessel, wherein it remains a sufficient length of time to allow the finely-divided materials held in suspension in the water to subside, and then the supernatant water is drawn off, leaving the material at the bottom of the vat or containing vessel in a plastic state—the clay possessing sufficient adhesiveness to hold together when alone or mixed with the flint powder so as to permit the removal of the water. When the supernatant water has been removed, it has also been the practice to further dry the mass by evaporation induced by heat.

My said invention relates to the separation of the water from the milky fluid or pap for the purpose of preparing the clay for potters' use or for the market, whether the pap be composed of the clay and ground flint or clay alone mixed with the water.

In carrying out my invention I make use of the property of adhesiveness of the clay and the difference of specific gravity between it and water in the following manner: I place the pap in a cylindrical vessel, connected with a rotating mechanism, and set the vessel whirling at a rapid rate. The centrifugal force communicated to the mixture causes it to be thrown outward from the middle of the vessel and upon the sides thereof, extending upward (when the vessel is placed in a vertical position) so as to coat the sides of the vessel. The finely-divided particles of clay, being a little heavier than the water, are thrown against the sides of the vessel and adhere thereto, and as the operation progresses the coating becomes thicker, and the water becomes separated to a greater or less extent from the mass, depending upon the length of time the operation is carried on. The whirling is continued until the mass adhering to the sides of the vessel becomes condensed to the consistency required for the purposes to which it is to be applied, and the motion being stopped, the water will be found in the middle of the vessel at the bottom, and may be drawn off therefrom by a pipe leading out of the bottom of the vessel or by a siphon.

The sides of the whirling vessel should be imperforate, and impermeable by the water when the machine is in operation, otherwise the fine particles of flint and clay will escape through the sides with the water and the process cannot be successfully carried on, and for this reason it is impossible to effect or assist the condensation of the pap and its separation from the water when the particles composing it are reduced to the proper size by the operation of straining without losing the finer particles of the pap, as by such operation the coarser particles are retained, and the finer escape with the water so long as that is allowed to escape through the sides of the vessel.

If it be desired to dry the material more than would be effected by carrying on this operation at the ordinary temperature, a steam-jacket may be placed around the vessel to which steam may be supplied through the shaft of the whirl, which in that case would have to be hollow.

The material having been brought to the desired state by the operation I have described, may then be removed from the vessel in the plastic state to be used by the potter; or it may be solidified by evaporation and prepared for market as potter's clay in the usual manner.

In carrying out my improved process the coating of clay upon the sides of the whirling vessel is exposed to the atmosphere under very favorable conditions for evaporation, because the amount of pap or clay mixture to be placed in the vessel to be operated upon is much less than the vessel will hold—say about one-third of the contents of the vessel or less. Therefore when the vessel is set whirling rapidly the mixture is at once thrown out to the sides of the vessel, rising up to the top, or nearly so, and the middle of the vessel left unoccupied and open to the atmosphere.

But more particularly to describe my said invention, I will refer to the drawings, in which is figured the apparatus I use.

Figure 2:
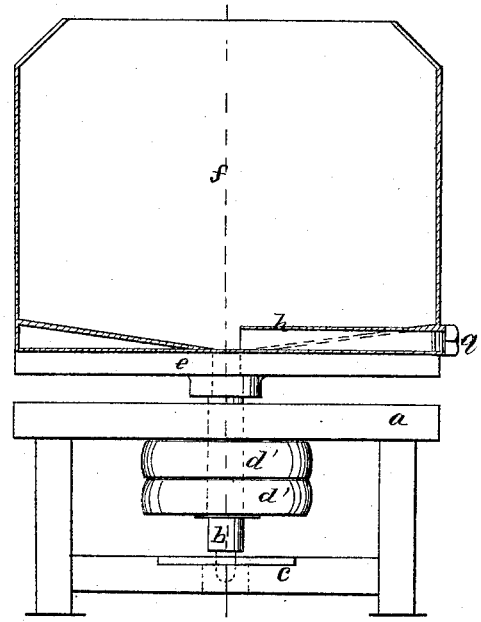

Figure 1 of the dawings is a plan view, and Fig. 2 a section of the whirling vessel and its rotating mechanism.

Letter $a$ represents the frame; letter $b$, a vertical shaft stepped in a cross-bar, $c$, at the bottom of the frame, and provided with tight and loose pulleys $d$ and $d'$. The upper part of the shaft runs in bearing fitted to it, and carries a horizontal disk or platform, $e$. Upon the platform is the whirling vessel $f$, secured to the platform by screw-bolts $g$ and $g'$ or in any other convenient manner. A pipe, $h$, leads from the center of the vessel at the bottom outward to its periphery, and is closed at the end by screw-plug $q$ or in any other convenient manner. This pipe may be dispensed with, and in its place a hole may be made in the center of the vessel communicating with a hole in the shaft; or a pump or siphon may be used to draw off the water. At the top of the vessel the sides tumble or incline inward, to prevent the material from being thrown out of the vessel and to confine it to the sides thereof.

Figure 3:
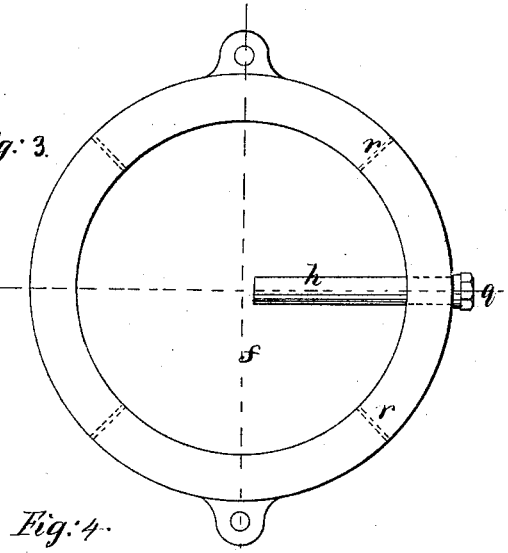
Figure 4:
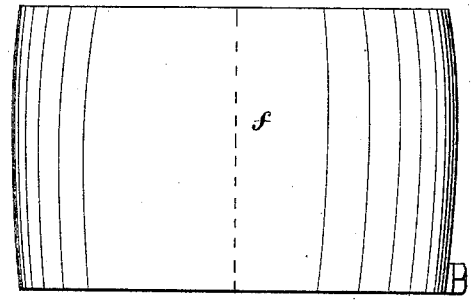
Figure 5:
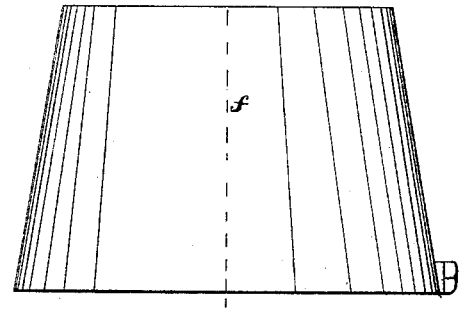

At Fig. 3 of the drawings wings $r$ are shown by dotted lines, which may be attached to the sides. There are also shown at Figs. 4 and 5 different forms of whirling vessels which I have used to advantage, but I prefer the forms shown at Figs 1 and 2.

I claim—

As my improvement in the process of preparing clays for potters' use or for the market, the above-described improved mode of condensing the pap or slops of clay by subjecting the slops in proper quantities to the action of centrifugal force in a whirling vessel having imperferate and impermeable sides, substantially as described, whereby the clay by reason of its adhesiveness and greater specific gravity is condensed and separated from the water to the desired extent without recourse to straining, by which a portion of the clay is lost, and adheres to the sides of the vessel, from which it may be removed in a plastic state for potters' use or to be prepared in the usual manner for the market as potter's clay.

JOSEPH MUIR.

Witnesses:
F. C. TREADWELL, Junr.,
GUERNSEY SACKETT.